US010253116B2

(12) United States Patent
Soddu et al.

(10) Patent No.: US 10,253,116 B2
(45) Date of Patent: Apr. 9, 2019

(54) PROCESS FOR THE PREPARATION OF DIENE POLYMERS OR RANDOM VINYL ARENE-DIENE COPOLYMERS

(71) Applicant: Versalis S.P.A., San Donato Milanese (IT)

(72) Inventors: Luca Soddu, Bologna (IT); Andrea Vallieri, Bologna (IT); Antonio Solito, Ravenna (IT)

(73) Assignee: Versalis S.P.A., San Donato Milanese (IT)

( * ) Notice: Subject to any disclaimer, the term of this patent is extended or adjusted under 35 U.S.C. 154(b) by 12 days.

(21) Appl. No.: 15/316,617

(22) PCT Filed: Aug. 19, 2015

(86) PCT No.: PCT/EP2015/069025
§ 371 (c)(1),
(2) Date: Dec. 6, 2016

(87) PCT Pub. No.: WO2016/026887
PCT Pub. Date: Feb. 25, 2016

(65) Prior Publication Data

US 2017/0335027 A1 Nov. 23, 2017

(30) Foreign Application Priority Data

Aug. 20, 2014 (IT) .......................... MI2014A001504

(51) Int. Cl.

*C08F 36/06* (2006.01)
*C08F 212/08* (2006.01)
*C08F 236/06* (2006.01)
*C08F 236/10* (2006.01)
*C08F 112/08* (2006.01)

(52) U.S. Cl.

CPC ............ *C08F 36/06* (2013.01); *C08F 112/08* (2013.01); *C08F 212/08* (2013.01); *C08F 236/06* (2013.01); *C08F 236/10* (2013.01); *C08F 2438/02* (2013.01)

(58) Field of Classification Search

CPC ..... C08F 36/06; C08F 112/08; C08F 2438/02
USPC ................................ 526/180, 346, 335, 220
See application file for complete search history.

(56) References Cited

U.S. PATENT DOCUMENTS 5,914,378 A 6/1999 Viola et al.
6,303,721 B1 10/2001 Latsch et al.
6,350,834 B1 2/2002 Schade et al.
6,353,056 B1 3/2002 Knoll et al.
6,858,683 B2 2/2005 Viola et al.
7,351,777 B2 4/2008 Moore et al.
2004/0220344 A1* 11/2004 DeDecker ............. C08F 293/00 525/242
2010/0240909 A1 9/2010 Caldararo et al.

OTHER PUBLICATIONS

International Search Report for PCT/EP2015/069025 dated Nov. 16, 2015, 9 pgs.
Viola et al. "Coupling Reaction of Polyisoprenyllithium with 1,2-Dibromoethane", "Journal of Polymer Science, Part A: Polymer Chemistry" (1997), vol. 35, pp. 17-25.
Viola et al. "Thermolytic Behavior of Polydienyllithium and Polystyryllithium", "Journal of Polymer Science, Part A: Polymer Chemistry" (1996), vol. 34, pp. 12-24.
"Application Note" (1996), No. 9, Wyatt Technology.
Pavel Kratochvil "Classical Light Scattering from Polymer Solutions" (1987), Polymer Science Library, 5, Elsevier Science Publishers B. V.

* cited by examiner

*Primary Examiner* — William K Cheung
(74) *Attorney, Agent, or Firm* — Abel Law Group, LLP

(57) ABSTRACT

Process for the preparation of a diene polymer or a random vinyl arene-diene copolymer comprising anionically (co) polymerizing at least one conjugated diene monomer, optionally in the presence of at least one vinyl arene, in the presence of at least one hydrocarbon solvent, at least one lithium-based initiator and at least one organic compound containing at least one nitrox- ide group having general formula (I) or (II): wherein: $R^1$, $R^2$, $R^3$ and $R^4$, mutually identical or different, represent a hydrogen atom; or are selected from $C_1$-$C_{20}$, preferably $C_1$-$C_8$, linear or branched alkyl groups optionally containing heteroatoms such as, for example, oxygen, nitrogen, sulphur, optionally substituted cycloalkyl groups, optionally substituted $C_1$-$C_{20}$, preferably $C_1$-$C_8$, linear or branched alkoxy groups, optionally substituted aryl groups; -x is an integer ranging from 0 to 7, preferably ranging from 4 to 5; -y is an integer ranging from 1 to 3, preferably ranging from 1 to 2.

$$R^1 \left[ (R^2R^3C)_x - \overset{O^\bullet}{\overset{|}{N}} \right]_y R^4 \quad \text{(I)}$$

$$\left[ (R^2R^3C)_x - \overset{O^\bullet}{\overset{|}{N}} \right]_y \text{ (cyclic)} \quad \text{(II)}$$

19 Claims, No Drawings

PROCESS FOR THE PREPARATION OF DIENE POLYMERS OR RANDOM VINYL ARENE-DIENE COPOLYMERS

This application is a national stage application under 35 U.S.C. § 371 of PCT International Application No. PCT/EP2015/069025, filed Aug. 19, 2015, which claims the benefit of Italy Application No. MI2014A001504, filed on Aug. 20, 2014, which are hereby incorporated by reference in their entirety.

The present invention relates to a process for the preparation of a diene polymer or a random vinyl arene-diene copolymer.

More particularly, the present invention relates to a process for the preparation of a diene polymer or a random vinyl arene-diene copolymer comprising anionically (co)polymerising at least one conjugated diene monomer, optionally in the presence of at least one vinyl arene, in the presence of at least one hydrocarbon solvent, at least one lithium-based initiator and at least one organic compound containing at least one nitroxide group.

The resultant diene polymer or random vinyl arene-diene copolymer has a linear macrostructure and elevated stability of the carbanionic/living end group(s). In particular, the reactivity of the alkyl, diene and/or vinylaryl carbanionic end group(s) is modified by using at least one organic compound containing at least one nitroxide group which is non-reactive under the (co)polymerisation conditions.

The use of alkyllithium initiators in "living" anionic (co)polymerisation, has been widely described in its basic characteristics in the literature, as well as the use of polar aprotic substances (modifiers) for controlling the microstructure of the (co)polymer obtained from said (co)polymerisation (i.e. the type of linkages in the case in which just one conjugated diene monomer is involved which, for example in the case of butadiene being polymerised, may give rise to polybutadiene with a 1,4-trans, 1,4-cis or 1,2 structure, or the distribution of the two or more monomers present, for example butadiene and styrene, in the case of copolymerisation to give a butadiene-styrene copolymer).

"Living" anionic (co)polymerisation in solution, i.e carried out in the presence of at least one hydrocarbon solvent, and of at least one lithium-based initiator (selected, for example, from alkyllithiums), typically yields linear (co) polymers having a polydispersity index $M_w/M_n$ [i.e. the ratio between the weight-average molecular weight ($M_w$) and the number-average molecular weight ($M_n$)] which is directly associated with the type of (co)polymerisation process used for the preparation thereof. Generally, for example, a process carried out discontinuously ("batchwise") results in monomodal (co)polymers having a polydispersity index $M_w/M_n<1.3$, while a process carried out continuously results in monomodal (co)polymers, the polydispersity index of which depends on the number of reactors, generally CSTR type reactors used in series, and on the degree of conversion in each individual reactor. In the case of a series system of ideal CSTR type reactors and in the presence of living anionic (co)polymerisation without termination reactions, (co)polymers having a polydispersity index $M_w/M_n$ of ≤2 are obtained, whereas normally, in reality, (co)polymers having a polydispersity index $M_w/M_n \leq 2.3$ are obtained.

It is also known that optional branching may be introduced into the (co)polymers obtained by adopting various synthesis strategies such as, for example, a coupling reaction of the living carbanionic end groups with halides of elements belonging to group IV of the Periodic Table of Elements having general formula $MR_nCl_{4-n}$ in which n=3 or 4 such as, for example, silicon tetrachloride ($SiCl_4$) and tin tetrachloride ($SnCl_4$); or the formation of random branching by means of in situ production of primary radicals derived from a reaction between alkyl or allyl carbanions and alkyl bromides, as described, for example, by Viola et al. in "Coupling Reaction of Polyisoprenyllithium with 1,2-Dibromoethane", "*Journal of Polymer Science, Part A: Polymer Chemistry*" (1997), vol. 35, pp. 17-25 and in American patent U.S. Pat. No. 6,858,683. However, although the above-mentioned anionic (co)polymerisation is stated to be "living", there are in reality some side reactions involved in the preparation of (co)polymers from diene monomers and/or from vinyl arenes which result in deactivation of the living end group as a function of the characteristics of the reaction environment such as, for example, temperature, concentration of free diene monomer and/or vinyl arene and optional presence of modifiers. Said reactions broaden the molecular weight distribution, which is particularly obvious in the case of a process which is carried out continuously: this is because, in this case when at least two CSTR type reactors are used in series, (co)polymers are obtained which have a polydispersity index $M_w/M_n$ which may range from approx. 2 to approx. 3. The above-stated deactivation reactions of the living end group may be divided into in two distinct classes.

A first class involves termination by reaction with the protons in alpha position with respect to the heteroatoms of ethers/amines, which are compounds commonly used as modifiers (i.e. randomisers and vinyl promoters) during anionic (co)polymerisation of diene monomers and/or vinyl arenes. This reaction is significant at temperatures greater than 50° C., depending on the chemical nature of the modifier, in other words on the ability of the latter to form stable complexes with the lithium cation. It is indeed known that the effect which a modifier has on the kinetic parameters of the anionic (co)polymerisation reaction (i.e. homopolymerisation constants, quantity of 1,2-vinyl linkages in a polybutadiene, "crossover" constants during (co)polymerisation) is dependent, other than on its own concentration, on its ability to form stable complexes with the $Li^+$ counterion. In this respect, using chelating ethers, namely compounds which have two oxygen atoms separated by 2 or 3 carbon atoms gives rise, at concentrations of a few hundred ppm, to butadiene and styrene homopolymerisation constants which, at identical temperature, are obtained when using non-chelating (or solvating) ethers, such as tetrahydrofuran (THF), at concentrations two orders of magnitude higher. The chelating ethers generally have an equally pronounced effect on the 1,2-vinyl linkage content during preparation of a polybutadiene and on "crossover" constants during copolymerisation. In this latter case, copolymers are obtained with a distribution of the monomer units which is closer to ideal (i.e. random copolymers). Non-limiting examples of the chelating ethers which may be used for this purpose are 2-methoxyethyl tetrahydrofuran and 2-methoxyethyl tetrahydropyran, the latter being described, for example, in American patent U.S. Pat. No. 5,914,378. In reality, it has been observed that the improvement in kinetic parameters of processes carried out in the presence of said chelating ethers, in particular the ability to promote 1,2-vinyl linkages and the maximally random distribution of the monomer units, conflicts with the stability of the living carbanionic end group. This is because chelating ethers which interact strongly with the $Li^+$ cation promote termination of the carbanion by reaction between the latter and the protons in alpha position with respect to the oxygen atoms of the ether. This situation, as described for example in European patent EP 1,829,906, makes it necessary to research the optimum conditions (i.e. type of modifier and process parameters) for obtaining products having microstructural and macrostructural characteristics which are suitable for various fields of application.

The second class involves termination by reaction with an allyl proton of a polydiene chain which has already formed. This reaction is the first stage of a series of reactions which lead to the formation of branching by a thermal pathway as described, for example, by Viola et al. in "Thermolytic Behavior of Polydienyllithium and Polystyryllithium", "*Journal of Polymer Science, Part A: Polymer Chemistry*" (1996), vol. 34, pp. 12-24. Experimental evidence has shown that this is a significant mechanism at temperatures of greater than approx. 110° C. in the absence of modifiers, and of approx. 90° C. in the presence of the latter.

In both cases, the above-stated termination reactions have a non-negligible impact on the macrostructure of the (co) polymers obtained and, as a consequence, on the practical management of the processes used for the preparation thereof. The effects of said termination reactions may be summarised as follows.

Said termination reactions in fact bring about a progressive reduction in the concentration of living carbanionic end groups during the (co)polymerisation reaction. This has significant effects of the efficiency of any post-modification reactions which depend on the concentration of the living carbanionic end groups. Examples which may be mentioned are coupling reactions with at least one coupling agent selected, for example, from compounds of the $R_{4-n}MCl_n$ type [for example, silicon tetrachloride ($SiCl_4$), tin tetrachloride ($SnCl_4$)] which are used to produce (co)polymers having a "star shaped" structure (non-random "branching"). The maximum content achievable by structures of this type, stated as coupling efficiency in percentage by weight with respect to the total mass of the macromolecules, is obtained when the coupling agent is introduced stoichiometrically with respect to the total concentration of the living carbanionic end groups present in the reaction environment which, as described previously, decreases over time because of deactivation reactions. Furthermore, the progressive reduction in concentration of living carbanionic end groups sets somewhat rigid limits to process management, whether carried discontinuously ("batchwise") or carried out continuously, associated with the production of (co)polymers having a relatively high number-average molecular weight ($M_a$) (i.e. $M_n$>250000 dalton) because the requirement of completely removing the free monomers from the reaction environment cannot be met by indefinitely increasing reaction times and temperatures.

Furthermore, said termination reactions lead to the production of long chain branching (LOB). In comparison with the case represented by a linear (co)polymer, an appreciable variation in some fundamental rheological properties thereof is obtained, for example, pseudoplasticity and characteristics associated with elongational type flow. It is known, for example, that in the sector of elastomers for tyre tread applications (typically "solution styrene-butadiene rubber" (SSBR)) processability, taken to mean the time required to produce a blend comprising one or more elastomers, at least one filler, generally carbon black or silica, and the vulcanising formulation, together with the final quality of said blend (i.e. optimum dispersion of the ingredients) is another essential feature which depends on the presence of branching. Said processability is generally improved by the presence of a certain level of long chain branching (LOB). It is moreover known that the quality of the blend determines the quality of the resilient network obtained from the vulcanisation reaction and, consequently, both the dynamic properties of the finished manufactured article such as, for example, rolling resistance, and the hysteretic properties of the finished manufactured article associated with wet grip and braking. For example, in the case of a polybutadiene with a low vinyl content, obtained from a process carried out continuously, the presence of long chain branching (LCB) is important for the purpose of reducing the product's tendency towards "cold flow", with consequent problems for management thereof during storage and final use of the bales of the finished product. However, an excessive quantity of long chain branching (LOB) in the (co)polymer obtained may have an adverse effect on the properties of the finished manufactured article in the case in which said (co)polymer is used for modifying plastic materials [for example, to obtain "high impact polystyrene" (HIPS)], for example with regard to surface gloss.

Furthermore, said termination reactions broaden the amplitude of the molecular mass distribution (MWD) curve described by the polydispersity index $M_w/M_n$. Said broadening is the direct result of the formation of long chain branching (LCB) in the (co)polymer obtained and also of the variation in concentration of the living carbanionic end groups as a function of reaction time. The polydispersity index $M_w/M_n$ of a (co)polymer is another parameter which has a significant influence on some of the fundamental rheological properties thereof. It has in fact been observed that, at polydispersity index $M_w/M_n$ values>2.5, there is a progressive deterioration in the characteristics of the blend in which it is used which has an impact on the behaviour of the finished manufactured article, for example, tyre tread, as mentioned above. In the light of the effect of termination reactions on the rheological properties of the (co)polymer obtained and on the final characteristics of the manufactured articles containing it, there would seem to be an obvious requirement to be able to control said reactions effectively in order to obtain products with characteristics which are "optimised" to the final application.

Processes capable of controlling reaction kinetics during anionic (co)polymerisation are known in the art.

For example, American patent U.S. Pat. No. 6,303,721 describes a process for anionic polymerisation of diene monomers or copolymerisation of diene monomers and vinyl aromatic monomers, in the presence of a vinyl aromatic monomer or a mixture of vinyl aromatic monomers as solvent, in which (co)polymerisation is carried out in the presence of an initiator selected from alkali metal alkyls or aryls (e.g., s-butyllithium), an alkyl or aryl of an element having a valency of at least 2 (e.g., dibutylmagnesium) and without the addition of Lewis bases and using a quantity of less than 40% by volume of a further solvent, with respect to the total volume of the vinyl aromatic monomer or mixture of vinyl aromatic monomers. The above-stated process is stated to permit good control of the rate of anionic (co)polymerisation and to allow (co)polymers usable in moulding compositions to be obtained.

American patent U.S. Pat. No. 6,353,056 describes a process for the preparation of block copolymers from vinyl aromatic and diene monomers in the presence of at least one alkyl, aryl or arylalkyl compound of an alkali metal (e.g., s-butyllithium) or of an alkoxide of an alkali metal (e.g., lithium t-butoxide) and at least one compound of magnesium, zinc or aluminium (e.g., dibutylmagnesium), comprising carrying out copolymerisation at an initial monomer concentration ranging from 50% by volume to 100% by volume. The above-stated process is stated to permit good control of the rate of copolymerisation.

American patent U.S. Pat. No. 6,350,834 describes a process for the homopolymerisation of vinyl aromatic monomers or for the block copolymerisation of vinyl aromatic and diene monomers in the presence, as initiator, of a composition essentially consisting of: (I) at least one alkyl, aryl or arylalkyl compound of an alkali metal (e.g., s-butyllithium), or at least one alkoxide of an alkali metal (e.g., lithium t-butoxide), or at least one alkali metal thiolate, or at least one alkali metal amide and (II) at least one compound of aluminium, or at least one aluminoxane, or at least one compound of boron, or at least one boroxane, wherein said composition contains, with respect to the sum of molar equivalents of alkali metal, aluminium and boron, (a) from 0.1 to 3.9 molar equivalents of oxygen, sulfur or nitrogen and (b) from 0.1 to 3.9 molar equivalents of an organic ligand. The above-stated process is stated to permit good control of the rate of (co)polymerisation over a wide range of concentrations and temperatures.

American patent U.S. Pat. No. 7,351,777 describes an improved process for anionic polymerisation comprising polymerising a vinyl aromatic monomer in the presence of a heterogeneous polymerisation retardant. Said retardant is insoluble and may be removed at an intermediate stage of the polymerisation, so in any event permitting complete conversion of the vinyl aromatic monomer.

However, the above-stated anionic (co)polymerisation processes do not always yield the desired results, for example, in terms of stability of the living carbanionic end group(s) and/or of control of the macrostructure of the (co)polymer obtained.

The Applicant therefore set itself the problem of finding a process for the preparation via an anionic route of a diene polymer or a random vinyl arene-diene copolymer, which is capable of increasing the stability of the living carbanionic end group(s) and of improving control of the macrostructure of the (co)polymer obtained.

The Applicant has now found that a diene polymer or a random vinyl arene-diene copolymer may advantageously be prepared by a process comprising anionically (co)polymerising at least one conjugated diene monomer, optionally in the presence of at least one vinyl arene, in the presence of at least one hydrocarbon solvent, at least one lithium-based initiator and at least one organic compound containing at least one nitroxide group. Said process makes it possible to increase the stability of the living carbanionic end group(s) of the (co)polymer obtained. Furthermore, said process makes it possible to improve control of the macrostructure of the (co)polymer obtained: this is because inhibiting the side reactions associated with the termination reaction results in a (co)polymer characterised by a linear macrostructure without long chain branching (LCB). Furthermore, said process makes it possible to reduce the molecular mass distribution (MWD) curve and consequently the polydispersity index $M_w/M_n$ of the (co)polymer obtained.

The present invention accordingly provides a process for the preparation of a diene polymer or a random vinyl arene-diene copolymer comprising anionically (co)polymerising at least one conjugated diene monomer, optionally in the presence of at least one vinyl arene, in the presence of at least one hydrocarbon solvent, at least one lithium-based initiator and at least one organic compound containing at least one nitroxide group having general formula (I) or (II):

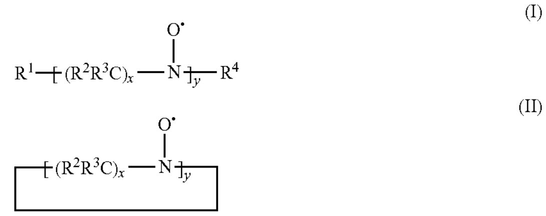

wherein:

$R^1$, $R^2$, $R^3$ and $R^4$, mutually identical or different, represent a hydrogen atom; or are selected from $C_1$-$C_{20}$, preferably $C_1$-$C_8$, linear or branched alkyl groups optionally containing heteroatoms such as, for example, oxygen, nitrogen or sulfur, optionally substituted cycloalkyl groups, optionally substituted $C_1$-$C_{20}$, preferably $C_1$-$C_8$, linear or branched alkoxy groups, optionally substituted aryl groups;

x is an integer ranging from 0 to 7, preferably ranging from 4 to 5;

y is an integer ranging from 1 to 3, preferably ranging from 1 to 2.

For the aim of the present description and of the following claims, unless stated otherwise, definitions of numerical ranges always include the extremes.

For the aim of the present description and of the following claims, the term "comprising" also encompasses the terms "which essentially consists of" or "which consists of".

It should be noted that, for the aim of the present invention, the groups ($R^2R^3C$) in general formula (II) may also differ from one another.

The term "$C_1$-$C_{20}$ alkyl groups" is taken to mean linear or branched alkyl groups having from 1 to 20 carbon atoms. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "$C_1$-$C_{20}$ alkyl groups optionally containing heteroatoms" is taken to mean linear or branched, saturated or unsaturated alkyl groups having from 1 to 20 carbon atoms, wherein at least one of the hydrogen atoms is substituted with a heteroatom selected from: halogens such as, for example, fluorine, chlorine, preferably fluorine; nitrogen; sulfur; oxygen. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl, oxymethyl, thiomethyl, thioethyl, dimethylamino, propylamino, dioctylamino.

The term "cycloalkyl groups" is taken to mean cycloalkyl groups having from 3 to 30 carbon atoms. Said cycloalkyl groups may optionally be substituted with one or more mutually identical or different groups selected from: halogen atoms; hydroxyl groups; $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

The term "$C_1$-$C_{20}$ alkoxy groups" is taken to mean linear or branched alkoxy groups having from 1 to 20 carbon atoms. Said alkoxy groups may optionally be substituted with one or more mutually identical or different groups selected from: halogen atoms, such as for example fluorine, chlorine, preferably fluorine; hydroxyl groups; $C_1$-$C_{20}$ alkyl groups; $C_1$-$C_{20}$ alkoxy groups; cyano groups; amino groups; nitro groups. Specific examples of $C_1$-$C_{20}$ alkoxy groups are: methoxy, ethoxy, fluoroethoxy, n-propoxy, iso-propoxy, n-butoxy, n-fluorobutoxy, iso-butooxy, t-butoxy, pentoxy, hexyloxy, heptyloxy, octyloxy, nonyloxy, decyloxy, dodecyloxy.

The term “aryl groups” is taken to mean aromatic carbocyclic groups. Said aryl groups may optionally be substituted with one or more mutually identical or different groups selected from: halogen atoms, such as for example fluorine, chlorine, bromine; hydroxyl groups; $C_1$-$C_{12}$ alkyl groups; $C_1$-$C_{12}$ alkoxy groups; cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene and anthracene.

It should be noted that, in the process object of the present invention, the nitroxide group present in the organic compound containing at least one nitroxide group having general formula (I) or (II), is inert under the conditions of the anionic (co)polymerisation carried out in the presence of at least one lithium-based initiator as mentioned above. The polar nature of said nitroxide group also makes it capable of significantly influencing the chemical surroundings of the reactive end group(s) present, as will be better illustrated in the examples below reported, in this way modifying either the anionic (co)polymerisation kinetics or the occurrence of the previously mentioned termination reactions.

According to a preferred embodiment of the present invention, said conjugated diene monomer may be selected, for example, from: 1,3-butadiene, isoprene, 2,3-dimethyl-1, 3-butadiene; 1,3-pentadiene (piperylene), 2-methyl-3-ethyl-1,3-butadiene, 1,3-octadiene, or mixtures thereof. Said conjugated diene monomer may advantageously be used in anhydrous form. 1,3-Butadiene, isoprene, or mixtures thereof, optionally in anhydrous form, are preferred. 1,3-Butadiene, optionally in anhydrous form, is particularly preferred. According to a preferred embodiment of the present invention, said vinyl arene may be selected, for example, from: styrene, α-methylstyrene, 1-vinylnaphthalene, 2-vinylnaphthalene, or the alkyl derivatives thereof, or mixtures thereof. Said vinyl arene may advantageously be used in anhydrous form. Styrene, optionally in anhydrous form, is preferred.

According to a preferred embodiment of the present invention, said anionic (co)polymerisation may be carried out in the presence of:

- 40% by weight-100% by weight, preferably 60% by weight-100% by weight, with respect to the total weight of conjugated diene monomer and optional vinyl arene, of at least one conjugated diene monomer; and
- 0% by weight-60% by weight, preferably 0% by weight-40% by weight, with respect to the total weight of conjugated diene monomer and optional vinyl arene, of at least one vinyl arene.

According to a preferred embodiment of the present invention, said hydrocarbon solvent may be selected, for example, from aliphatic, cycloaliphatic or aromatic hydrocarbon solvents such as, for example, propane, n-butane, iso-butane, n-pentane, iso-pentane, n-hexane, n-heptane, n-octane, cyclohexane, cyclopentane, propene, 1-butene, iso-butene, trans-2-butene, cis-2-butene, 1-pentene, 2-pentene, 1-hexene, 2-hexene, benzene, toluene, xylene, ethylbenzene, or mixtures thereof. Said solvents may advantageously be used in anhydrous form. n-Hexane, cyclohexane, or mixtures thereof, in anhydrous form, are preferred.

In general, the quantity of hydrocarbon solvent used in said anionic (co)polymerisation is such that it ensures complete solubility of the monomers (i.e. conjugated diene monomer and optional vinyl arene), of the optionally present additives and of the diene polymer or random vinyl arene-diene copolymer obtained on completion of said (co)polymerisation, complete stirring of the reaction mixture, including during said (co)polymerisation, and dissipation of the heat of reaction. Preferably, said hydrocarbon solvent is used in a quantity such that a concentration of monomers (i.e. conjugated diene monomer and optional vinyl arene) in the hydrocarbon solvent ranging from 4% by weight to 25% by weight, more preferably ranging from 8% by weight to 15% by weight, with respect to total weight of the hydrocarbon solvent, is obtained.

According to a preferred embodiment of the present invention, said lithium-based initiator may be selected, for example, from compounds having general formula (Ill):

$$R_5(Li)_n \tag{III}$$

wherein $R_5$ represents a $C_1$-$C_{20}$, preferably $C_2$-$C_{12}$, linear or branched alkyl group, a $C_3$-$C_{30}$, preferably $C_4$-$C_{10}$ cycloalkyl group, a $C_6$-$C_{30}$, preferably $C_6$-$C_{12}$ aryl group and n is an integer ranging from 1 to 4.

According to a particularly preferred embodiment of the present invention, said lithium-based initiator may be selected, for example, from: n-butyllithium, sec-butyllithium, t-butyllithium, n-propyllithium, iso-butyllithium, amyllithium, or mixtures thereof. n-Butyllithium is preferred.

The quantity of lithium-based initiator which may be used in the process object of the present invention depends on various factors such as, for example, the monomers which it is desired to (co)polymerise and the molecular weight of the (co)polymer which it is desired to obtain. Generally, said lithium-based initiator may be used in a quantity ranging from 0.01 phm to 0.2 phm (phm=parts per one hundred parts of monomer(s)). Preferably, said lithium-based initiator may be used in a quantity ranging from 0.01 phm to 0.1 phm, more preferably ranging from 0.025 phm to 0.07 phm.

With the aim of controlling the formation of a random vinyl arene-diene copolymer with a random distribution of the conjugated diene monomers and vinyl arenes, said anionic (co)polymerisation may be carried out in the presence of at least one polar modifier.

Consequently, according to a preferred embodiment of the present invention, said anionic (co)polymerisation is carried out in the presence of at least one polar modifier.

According to a preferred embodiment of the present invention, said polar modifier may be selected, for example, from: non-cyclic ethers such as, for example, ethyl ether, or mixtures thereof; tertiary amines such as, for example, tributylamine, or mixtures thereof; cyclic ethers such as, for example, tetrahydrofuran (THF), or mixtures thereof; chelating ethers such as, for example, ethylene glycol dimethyl ether (dimethyl glycol), dioxane, 2-methoxyethyl tetrahydrofuran (THFA-ethyl), 2-methoxyethyl tetrahydropyran, or mixtures thereof; chelating amines such as, for example, N,N,N',N'-tetramethylethylenediamine (TMEDA), or mixtures thereof; or mixtures thereof. 2-Methoxyethyl tetrahydrofuran (THFA-ethyl), 2-methoxyethyl tetrahydropyran, or mixtures thereof, are preferred. 2-Methoxyethyl tetrahydrofuran (THFA-ethyl) is particularly preferred.

The quantity of polar modifier which may be used in the process object of the present invention depends on various factors such as, for example, the quantity of lithium-based initiator used, the type of polar modifier used. By way of example, in the case of the process object of the present invention, methoxyethyl tetrahydrofuran (THFA-ethyl) may be used in a quantity ranging from 0.2 moles to 10 moles, preferably ranging from 0.5 moles to 5 moles, per mole of lithium-based initiator.

According to a preferred embodiment of the present invention, said organic compound containing at least one nitroxide group having general formula (I) or (II) may be selected, for example, from: 2,2,6,6-tetramethyl-1-piperidinyloxy (TEMPO) or derivatives thereof such as, for example, 4-hydroxy-2,2,6,6-tetramethyl-1-piperidinyloxy (4-hydroxy-TEMPO), or mixtures thereof; diphenylnitroxide or derivatives thereof, or mixtures thereof; 1,1,3,3-tetraethylisoindolin-2-yl-oxyl (TEDIO); 1,1,3,3-tetramethylisoindolin-2-yl-oxyl (TMEDIO); or mixtures thereof. 2,2,6,6-Tetramethyl-1-piperidinyloxy (TEMPO), 1,1,3,3-tetraethylisoindolin-2-yl-oxyl (TEDIO), or mixtures thereof are preferred.

According to a preferred embodiment of the present invention, said organic compound containing at least one nitroxide group having general formula (I) or (II), and said lithium-based initiator may be used in a molar ratio ranging from 0.1 to 20, preferably ranging from 0.5 to 3.5.

According to a preferred embodiment of the present invention, said anionic (co)polymerisation may be carried out at a temperature ranging from 0° C. to 150° C., preferably ranging from 20° C. to 120° C.

According to a preferred embodiment of the present invention, said anionic (co)polymerisation may be carried out for a time ranging from 5 minutes to 10 hours, preferably ranging from 30 minutes to 120 minutes.

According to a preferred embodiment of the present invention, the diene polymer or the random vinyl arene-diene copolymer obtained may have a polydispersity index $M_w/M_n$ ranging from 1 to 2.5, preferably ranging from 1.1 to 2.3.

The process object of the present invention may be carried out discontinuously ("batchwise"), or continuously, using known methods of the art.

In the case in which said process is carried out discontinuously ("batchwise"), the diene monomer and the optional vinyl arene, the hydrocarbon solvent and the optional polar modifier, are introduced into an adiabatic polymerisation reactor. The anionic (co)polymerisation reaction is subsequently initiated using a lithium-based initiator. Once monomer conversion is complete, a solution comprising the diene polymer or the random vinyl arene-diene copolymer is obtained which can be treated as described below. The temperature and reaction times used are those mentioned above.

In the case in which said process is carried out continuously, the diene monomer and the optional vinyl arene, the hydrocarbon solvent and the optional polar modifier are introduced into the first of a series of n polymerisation reactors (with n≥2), generally CSTR type reactors, together with the appropriate quantity of lithium-based initiator. The configuration of the polymerisation reactors (i.e. temperatures, residence times) is optimised in such a manner as to ensure that complete monomer conversion is achieved at the output from the $n-1^{th}$ polymerisation reactor. The polymer solution obtained in this manner is fed to the $n^{th}$ polymerisation reactor with residence times of at least 30 minutes: at the output from said $n^{th}$ polymerisation reactor, a solution comprising the diene polymer or the random vinyl arene-diene copolymer is obtained which can be treated as described below. The temperature and reaction times used are those mentioned above.

On completion of the above-stated process and optional post-modifying reactions [for example, coupling reaction in the presence of at least one coupling agent such as, for example, silicon tetrachloride ($SiCl_4$)], the solution comprising the diene polymer or the random vinyl arene-diene copolymer obtained is collected in tanks into which is introduced an appropriate antioxidants formulation, defined on the basis of the field of application for which said diene polymer or said random vinyl arene-diene copolymer is intended. It is possible to use for this purpose, for example, antioxidants belonging to the family of sterically hindered phenols (primary antioxidants), or to the family of organic phosphites or phosphonites (secondary antioxidants), or mixtures thereof, in quantities generally ranging from 0.05 parts to 0.5 parts of primary antioxidants per 100 g of (co)polymer obtained and ranging from 0.1 parts to 1 part of secondary antioxidants per 100 g of (co)polymer obtained. Examples of primary or secondary antioxidants which may advantageously be used for the aim of the present invention and which are commercially available are: Irganox® 1520 from Ciba, Irganox® 565 from Ciba, 2,6-di-t-butyl-4-methylphenol (BHT) from Great Lakes, Irgafos® 168 from Ciba.

If required by the type of diene polymer or random vinyl arene-diene copolymer obtained and/or by the associated field of application for which it is intended, it is possible to add an extender oil to the same tanks, preferably a non-aromatic oil or an oil with a low aromatic content which may be selected, for example, from: MES ("mild extraction solvate") oils or TDAE ("treated distillate aromatic extract") oils in which the quantity of aromatic compounds is less than 20% by weight. Generally, said extender oils may be added in a quantity ranging from 10 parts of oil to 50 parts of oil per 100 parts of diene polymer or random vinyl arene-diene copolymer, preferably ranging from 20 parts of oil to 40 parts of oil, per 100 parts of diene polymer or random vinyl arene-diene copolymer.

The diene polymer or the random vinyl arene-diene copolymer obtained according to the process object of the present invention, as such or containing the antioxidant and/or the extender oil, may be recovered from the solution obtained by means of well-established methods for removing solvent, for example by steam (stripping) and subsequent removal of the water and volatile residues from the diene (co)polymer crumbs obtained in this manner by passage through one or more extruders.

At least one alcohol, such as for example ethyl alcohol, may be added in order, during discharge of the solution comprising the diene polymer or random vinyl arene-diene copolymer, to prevent still active chains, by reacting with atmospheric oxygen, from giving rise to a coupling reaction which, by producing fractions with a molecular weight twice that of the precursor polymer or copolymer, would make interpretation of the characterisation results ambiguous. Said alcohol may preferably be added in stoichiometric quantity with respect to the quantity of lithium-based initiator used in the process.

The diene polymer or random vinyl arene-diene copolymer obtained by way of the process object of the present invention may be used, alone or blended with other polymeric and/or non-polymeric components, in numerous applications which require optimum control of macrostructure during the synthesis step. Examples of possible applications are: modifying plastic materials such as obtaining high impact polystyrene (HIPS) or acrylonitrile-butadiene-styrene (ABS) resins, or producing elastomer blends suitable for manufacturing tyres, in particular tyre treads.

Some illustrative, non-limiting examples of the present invention are provided below to assist in understanding the present invention and the implementation thereof.

EXAMPLES

The characterisation methods below reported were used.

Microstructure Analysis (Content of 1,2-vinyl Units and Bound Styrene)

Microstructure (content of 1,2-vinyl units and bound styrene) was determined by FTIR ("Fourier Transform Infra Red") spectroscopy by means of the absorption bands (and calculation of the relative intensity thereof) characteristic of the three types of butadiene linkage: 1,4-cis (800 $cm^{-1}$ and 640 $cm^{-1}$), 1,4-trans (1018 $cm^{-1}$ and 937 $cm^{-1}$) and 1,2 (934 $cm^{-1}$ and 887 $cm^{-1}$) and of bound styrene (between 715 $cm^{-1}$ and 680 $cm^{-1}$).

Determination of Molecular Mass Distribution (MWD)

The molecular mass distribution (MWD), which, combined with the results obtained by means of the SEC/MALLS method below reported, is also used as the basis for obtaining the polydispersity index (i.e. the ratio $M_w/M_n$), HMW ("High Molecular Weight"), $W_c$ ("Weight Coupling") and the molecular weight corresponding to the highest peak ($M_p$), was determined by means of Gel Permeation Chromatography (GPC) which was performed by causing a solution in tetrahydrofuran (THF) of the (co)polymer obtained to flow through a series of columns containing a solid phase composed of crosslinked polystyrene with a porosity of different sizes.

Determination of Weight-Average Molecular Weight ($M_w$) and Measurement of Branching Index ($g_m$) using the SEC/MALLS Method.

The weight-average molecular weight ($M_w$) and branching index ($g_m$) were determined according to an internal method based on the work described in "*Application Note*" (1996), no. 9, Wyatt Technology and by Pavel Kratochvil, "*Classical Light Scattering from Polymer Solutions*" (1987), Polymer Science Library, 5, Elsevier Science Publishers B. V.

By coupling a Multi-Angle Laser Light Scattering (MALLS) sensor with a conventional SEC/RI elution system, it was possible simultaneously to measure in absolute terms the weight-average molecular weight ($M_w$) and the radius of gyration of the macromolecules which are separated by the chromatographic system; the quantity of light scattered by a macromolecular species in solution may indeed be used directly to obtain the weight-average molecular weight ($M_w$) thereof, while the angular variation of the scattering is directly correlated with the average size thereof. The fundamental relationship (1) used is the following:

$$\frac{K*c}{R_\theta} = \frac{1}{M_w P_\theta} + 2A_2 c \tag{1}$$

in which:

$K^*$=optical constant dependent on the wavelength of the light used, the refractive index (dn/dc) of the polymer and the solvent used;

$M_w$=weight-average molecular weight;

c=concentration of the polymer solution;

$R_\theta$=intensity of the scattered light measured at an angle θ;

$P_\theta$=function which describes the variation of the scattered light with the angle at which it is measured, equal to 1 for angle θ=0.

For very low concentrations (typical of a GPC system), the above-stated fundamental relationship (1) is simplified to the fundamental relationship (2):

$$\frac{K*c}{R_\theta} = \frac{1}{M_w P_\theta} \tag{2}$$

and, by carrying out measurement at a plurality of angles, extrapolation to the zero angle of the function $K^*c/R_\theta$ as a function of $sen^2\theta/2$ directly provides the weight-average molecular weight ($M_w$) from the value of the intercept and the radius of gyration from the slope. Furthermore, given that this measurement is performed for each "slice" of the chromatogram, it is possible to obtain a distribution both of the weight-average molecular weight ($M_w$) and of the radius of gyration.

The dimensions of the macromolecules in solution are directly correlated with the degree of branching thereof: at identical weight-average molecular weight ($M_w$), the smaller are the dimensions of the macromolecules with respect to the corresponding linear molecule, the greater is the degree of branching.

Information relating to polymer macrostructure are deduced in two ways:

(1) qualitatively, from the value of the parameter a which represents the gradient of the curve which correlates the radius of gyration with the weight-average molecular weight ($M_w$): when, under the same analysis conditions, said value falls with respect to a macrostructure of linear type, a polymer is present which has a macrostructure of branched type and the typical value for polybutadiene with a high 1,4-cis unit content, in tetrahydrofuran (THF), is equal to 0.58-0.60;

(2) quantitatively by evaluating the branching index ($g_m$) which is defined for each macromolecule as the ratio between the mean-square radius of gyration of the branched macromolecule ($<r_2>_b$) and the mean-square radius of gyration of the linear macromolecule ($<r_2>_l$), at identical molecular weight represented by the following equation (3) ($M_i$ represents the weight-average molecular weight ($M_w$) of the "$i^{th}$" molecule)

$$g_{M_i} = \left[\frac{\langle r_2\rangle_b}{\langle r_2\rangle_l}\right]_{M_i}. \tag{3}$$

The branching index ($g_m$) represents the mean of the above reported ratio over the molecular mass distribution and is ranging from 0 to 1.

Determination of Mooney Viscosity

Mooney viscosity was determined at 100° C. using a Monsanto MV2000E viscometer, method ASTM D1646 with L type rotor and with times 1+4 ($ML_{1+4}$@100° C.).

Determination of Homopolymerisation Kinetics ($K_{homopolymerisation}$)

Homopolymerisation kinetics ($K_{homopolymerisation}$) were determined by analysing the UV-VIS absorption spectra recorded as below reported in Example 5.

Determination of Variation in Absorbance (Δabs)

The variation in absorbance (Δabs) was determined by analysing the UV-VIS absorption spectra recorded as below reported in Example 5.

Example 1 (Comparative)

600 grams of anhydrous cyclohexane (Bitolea) followed by 27 grams of freshly distilled anhydrous 1,3-butadiene (Versalis SpA) were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 80° C. and held constant within ±4° C. throughout the duration of the test. 0.5 mmol of n-butyllithium (Aldrich) were then introduced: the reaction conditions were maintained for 60 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 1.

Example 2 (Comparative)

600 grams of anhydrous cyclohexane (Bitolea) followed by 27 grams of freshly distilled anhydrous 1,3-butadiene (Versalis SpA) were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 120° C. and held constant within ±4° C. throughout the duration of the test. 0.5 mmol of n-butyllithium (Aldrich) were then introduced: the reaction conditions were maintained for 60 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 1.

Example 3 (Invention)

600 grams of anhydrous cyclohexane (Bitolea) followed by 27 grams of freshly distilled anhydrous 1,3-butadiene (Versalis SpA) and, subsequently, 0.5 mmol of 1,1,3,3-tetraethylisoindolin-2-yl-oxyl (TEDIO) obtained as described in American patent application US 2010/0240909 were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 120° C. and held constant within ±4° C. throughout the duration of the test. 0.5 mmol of n-butyllithium (Aldrich) were then introduced to obtain a molar ratio between 1,1,3,3-tetraethylisoindolin-2-yloxyl (TEDIO) and the quantity of active n-butyllithium of approx. 1:1: the reaction conditions were maintained for 60 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 1.

Example 4 (Invention)

600 grams of anhydrous cyclohexane (Bitolea) followed by 27 grams of freshly distilled anhydrous 1,3-butadiene (Versalis SpA) and, subsequently, 1 mmol of 1,1,3,3-tetraethylisoindolin-2-yl-oxyl (TEDIO) obtained as described above were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 120° C. and held constant within ±4° C. throughout the duration of the test. 0.5 mmol of n-butyllithium (Aldrich) were then introduced to obtain a molar ratio between 1,1,3,3-tetraethylisoindolin-2-yl-oxyl (TEDIO) and the quantity of active n-butyllithium of approx. 2:1: the reaction conditions were maintained for 60 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 1.

TABLE 1

| Example | Temperature [° C.] | [=N—O]/[n-butLi] | D | HMW [%] | $K_{homopolymerisation}$ [$l \times mol^{-1} \times s^{-1}$] |
|---|---|---|---|---|---|
| 1 (comparative) | 80 | 0 | 1.08 | 0 | — |
| 2 (comparative) | 120 | 0 | 1.28 | 31.4 | 16.5 |
| 3 (invention) | 120 | 1.16 | 1.18 | 18.1 | 13 |
| 4 (invention) | 120 | 1.75 | 1.11 | 11.0 | 11 |

D: polydispersity index $M_w/M_n$;
HMW ("High Molecular Weight"): content, stated in percent by weight, of the fractions with a molecular weight which is a multiple of the molecular weight of the precursor polymer due to the presence of metalation termination reactions of the chain which lead to the formation of random branching;
($K_{homopolymerisation}$): homopolymerisation rate constant.

On the basis of the data reported in Table 1, the following comments may be made. Example 1, carried out at 80° C. shows that, in the absence of the compound containing a nitroxide group (=N—O), the temperature is too low to give rise to the termination reaction and that the polymer completely lacks a high molecular weight fraction. In contrast, Example 3 and Example 4, compared with Example 2, show that the presence of the compound containing a nitroxide group ([=N—O]) significantly inhibits the formation of branching with a consequent reduction in the polydispersity index $M_w/M_n$. An appreciable reduction in the value of the homopolymerisation rate constants ($K_{homopolymerisation}$) is also observed.

Example 5 (Comparative)

600 grams of anhydrous cyclohexane (Bitolea) followed by 27 grams of freshly distilled anhydrous butadiene (Versalis SpA) and 100 ppm of 2-methoxyethyl tetrahydrofuran (THFA-ethyl) (Thomas Swan) were introduced into a 1 liter stirred reactor equipped with a jacket for circulation of a temperature-control fluid. The reactor was fitted with a system for continuous measurement of the UV-VIS absorption spectra of the polymer solution. Said system consists of a quartz flow cell having an optical pathlength of 2 mm, connected to the reactor by means of a circuit into which an HPLC pump draws the polymer solution, passes it through the flow cell and returns it to the reactor. This enables continuous measurement of the concentration of the butadienyl living end group by application of the Lambert Beer law:

$$A = I\varepsilon c$$

in which A is absorbance, I is the optical pathlength of the measurement cell, ε is the molar absorbance coefficient (which for butadienyl in the presence of 2-methoxyethyl tetrahydrofuran is approx. 6500 $l \times cm^{-1} \times mol^{-1}$) and c is the molar concentration. The UV-VIS spectrum was measured using a Perkin Elmer Lambda 25 spectrophotometer in the range from 260 to 400 nm, at 2 minute intervals between one measurement and the next for the purpose of measuring the extent of the termination reaction.

The temperature of the reaction mixture was thermostatically controlled to 70° C. and held constant within ±4° C. throughout the duration of the test. 1 mmol of n-butyllithium (Aldrich) was then introduced: the reaction conditions were maintained for 30 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 2.

Example 6 (Invention)

600 grams of anhydrous cyclohexane (Bitolea) followed by 27 grams of freshly distilled anhydrous butadiene (Versalis SpA), 100 ppm of 2-methoxyethyl tetrahydrofuran (THFA-ethyl) (Thomas Swan) and, subsequently, 0.5 mmol of 1,1,3,3-tetraethylisoindolin-2-yl-oxyl (TEDIO) obtained as described above were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 70° C. and held constant within ±4° C. throughout the duration of the test. 0.5 mmol of n-butyllithium (Aldrich) were then introduced to obtain a molar ratio between 1,1,3,3-tetraethylisoindolin-2-yl-oxyl (TEDIO) and the quantity of active n-butyllithium of approx. 1:1: the reaction conditions were maintained for 30 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 2.

Example 7 (Invention)

600 grams of anhydrous cyclohexane (Bitolea) followed by 27 grams of freshly distilled anhydrous butadiene (Versalis SpA), 100 ppm of 2-methoxyethyl tetrahydrofuran (THFA-ethyl) (Thomas Swan) and, subsequently, 1 mmol of 1,1,3,3-tetraethylisoindolin-2-yl-oxyl (TEDIO) obtained as described above were introduced into a 1 liter stirred reactor equipped with a jacket for circulation of a temperature-control fluid. The reactor was fitted with a system for continuous measurement of the UV-VIS absorption spectra of the polymer solution which functions as described in Example 5. The temperature of the reaction mixture was thermostatically controlled to 70° C. and held constant within ±4° C. throughout the duration of the test. 0.5 mmol of n-butyllithium (Aldrich) were then introduced to obtain a molar ratio between 1,1,3,3-tetraethylisoindolin-2-yl-oxyl (TEDIO) and the quantity of active n-butyllithium of approx. 2:1: the reaction conditions were maintained for 30 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 2.

Example 8 (Comparative)

600 grams of anhydrous cyclohexane (Bitolea) followed by 9 grams of anhydrous styrene (Versalis SpA) were introduced into a 1 liter stirred reactor equipped with a jacket for circulation of a temperature-control fluid. The reactor was fitted with a system for continuous measurement of the UV-VIS absorption spectra of the polymer solution which functions as described in Example 5: in this case, the molar absorbance coefficient E for styryl in the Lambert Beer law is approx. 10000 l $cm^{-1}$×$mol^{-1}$. The temperature of the reaction mixture was thermostatically controlled to 80° C. and held constant within ±4° C. throughout the duration of the test. 1 mmol of n-butyllithium (Aldrich) was then introduced: the reaction conditions were maintained for 30 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 2.

Example 9 (Invention)

600 grams of anhydrous cyclohexane (Bitolea) followed by 9 grams of anhydrous styrene (Versalis SpA) and, subsequently, 2 mmol of 1,1,3,3-tetraethylisoindolin-2-yl-oxyl (TEDIO) obtained as described above were introduced into a 1 liter stirred reactor equipped with a jacket for circulation of a temperature-control fluid. The reactor was fitted with a system for continuous measurement of the UV-VIS absorption spectra of the polymer solution which functions as described in Example 5: in this case, the molar absorbance coefficient E for styryl in the Lambert Beer law is approx. 10000 l×$cm^{-1}$×$mol^{-1}$. The temperature of the reaction mixture was thermostatically controlled to 80° C. and held constant within ±4° C. throughout the duration of the test. 1 mmol of n-butyllithium (Aldrich) was then introduced to obtain a molar ratio between 1,1,3,3-tetraethylisoindolin-2-yl-oxyl (TEDIO) and the quantity of active n-butyllithium of approx. 2:1: the reaction conditions were maintained for 30 minutes, at the end of which ethyl alcohol (Carlo Erba) was introduced in an equimolecular quantity with respect to the quantity of n-butyllithium introduced. The polymer solution obtained was then discharged from the reactor, a phenolic antioxidant (Irganox® 1520 from Ciba in a quantity of 0.06% by weight with respect to total weight of the polymer obtained) was added and the solution was then sent for solvent removal by water stripping and subsequent drying by extrusion.

The polybutadiene obtained was subjected to some of the above-mentioned characterisations: the obtained results are reported in Table 2.

TABLE 2

| Examples | Temperature [° C.] | [=N—O]/ [n-butLi] | Δ abs [%] | $K_{homopolymerisation}$ [l × $mol^{-1}$ × $s^{-1}$] |
|---|---|---|---|---|
| 5 (comparative) (polybutadiene) | 70 | 0 | −25 | 7.7 |
| 6 (invention) (polybutadiene) | 70 | 1.07 | −17 | 4.5 |
| 7 (invention) (polybutadiene) | 70 | 1.85 | −10 | 2.2 |
| 8 (comparative) (polystyrene) | 80 | 0 | −14 | 4.1 |
| 9 (invention) (polystyrene) | 80 | 1.6 | −7 | 2.3 |

(Δ abs): variation in the absorbance of the butadienyl end group over a time interval of 2000 seconds (Examples 5, 6 and 7) and variation in the absorbance of the styryl end group over a time interval of 3000 seconds (Examples 8 and 9), measured from when the concentration maximum of the respective end group is reached: the values are stated as a percentage variation calculated with respect to the absorbance maximum; ($K_{homopolymerisation}$): homopolymerisation rate constant.

On the basis of the data reported in Table 2, it may be noted how, as the ratio between the compound containing a nitroxide group (=N—O) and the active n-butyllithium increases, the stability of the living end group increases significantly. In this case too, the homopolymerisation rate constants ($K_{homopolymerisation}$) fall.

Example 10 (Comparative)

8000 grams of a mixture of anhydrous cyclohexane (Bitolea)/n-hexane (Bitolea) in a 9:1 ratio by weight (equal to a filling factor of 80%) and 230 ppm of 2-methoxyethyl tetrahydrofuran (THFA-ethyl) (Thomas Swan), in a molar ratio of approx. 4:1 with the quantity of n-butyllithium, and, subsequently, 300 grams of anhydrous styrene (Versalis SpA) and 900 grams of anhydrous 1,3-butadiene (Versalis SpA) were introduced into a 16 liter stirred reactor: the mixture was heated to a temperature of 40° C. with a heating jacket. 0.25 grams of n-butyllithium (Aldrich) in cyclohexane (Bitolea) (1.6 g of 15% by weight solution) were then introduced: at this point, heating with the jacket was ceased and the increase in temperature of the reaction mixture was obtained due to the exothermic nature of the reaction, up to a final temperature (peak temperature) of 80° C. 10 minutes were allowed to elapse once the peak temperature had been reached in order to eliminate any monomers which were free at the end of polymerisation, after which 0.159 g of silicon tetrachloride ($SiCl_4$) (Aldrich), corresponding to 100% of the theoretical coupling efficiency, were introduced and a further 20 minutes were allowed to elapse for the coupling reaction to proceed to completion. The polymer solution obtained was discharged into a tank where it was stabilised with 0.7 phr of 2,6-di-t-butyl-4-methylphenol (BHT) (Great Lakes), after which 450 grams of TDAE ("treated distillate aromatic extract") non-aromatic oil (Repsol) were added and the resultant mixture was sent for solvent removal by water stripping and subsequent drying by extrusion.

The styrene-butadiene copolymer obtained was subjected to some of the above-mentioned characterisations: the obtained results are reported in Table 3.

Example 11 (Invention)

8000 grams of a mixture of anhydrous cyclohexane (Bitolea)/n-hexane (Bitolea) in a 9:1 ratio by weight (equal to a filling factor of 80%) and 230 ppm of 2-methoxyethyl tetrahydrofuran (THFA-ethyl) (Thomas Swan), in a molar ratio of approx. 4:1 with the quantity of n-butyllithium, and, subsequently, 300 grams of anhydrous styrene (Versalis SpA) and 900 grams of anhydrous 1,3-butadiene (Versalis SpA) were introduced into a 16 liter stirred reactor: the mixture was heated to a temperature of 40° C. with a heating jacket. 7.5 mmol of 2,2,6,6-tetramethyl-1-piperidinyloxy (TEMPO) (Aldrich) and 3.75 mmol of n-butyllithium (Aldrich) were then introduced to obtain a molar ratio between 2,2,6,6-tetramethyl-1-piperidinyloxy (TEMPO) and the quantity of active n-butyllithium of approx. 2:1: at this point, heating with the jacket was ceased and the increase in temperature of the reaction mixture was obtained due to the exothermic nature of the reaction, up to a final temperature (peak temperature) of 77° C. 20 minutes were allowed to elapse once the peak temperature had been reached in order to eliminate any monomers which were free at the end of polymerisation, after which 0.159 g of silicon tetrachloride ($SiCl_4$) (Aldrich), corresponding to 100% of the theoretical coupling efficiency, were introduced and a further 20 minutes were allowed to elapse for the coupling reaction to proceed to completion. The polymer solution obtained was discharged into a tank where it was stabilised with 0.7 phr of 2,6-di-t-butyl-4-methylphenol (BHT) (Great Lakes), after which 450 grams of TDAE ("treated distillate aromatic extract") non-aromatic oil (Repsol) were added and the resultant mixture was sent for solvent removal by water stripping and subsequent drying by extrusion.

The styrene-butadiene copolymer obtained was subjected to some of the above-mentioned characterisations: the obtained results are reported in Table 3.

TABLE 3

| Example | Styrene [%] | 1,2-Vinyl [%] | $M_w$ AB [dalton] | $W_c$ [%] | $M_n$ tot [dalton] | $M_p$ [dalton] | $M_w$ tot [dalton] | D | ML (dry) | ML (o.e.) |
|---|---|---|---|---|---|---|---|---|---|---|
| 10 (comparative) | 24.3 | 66.3 | 315000 | 79 | 857000 | 996000 | 952000 | 1.11 | 213 | 85.0 |
| 11 (invention) | 25.4 | 63.7 | 330000 | 95 | 1023000 | 1042600 | 1074000 | 1.05 | 232 | 94.1 |

Styrene: styrene content in the copolymer;
1,2-vinyl: 1,2-vinyl unit content in the copolymer;
$M_w$ AB: weight-average molecular weight of the copolymer;
$W_c$: "Weight Coupling" (indicates coupling efficiency);
$M_n$ tot: number-average molecular weight of the copolymer after addition of the silicon tetrachloride (i.e. after the coupling reaction);
$M_p$: molecular weight of copolymer corresponding to the highest peak;
$M_w$ tot: weight-average molecular weight of the copolymer after addition of the silicon tetrachloride (i.e. after the coupling reaction);
D: polydispersity index $M_w/M_n$;
ML: Mooney viscosity [dry = non-oil-extended (measured before addition of non-aromatic oil); o.e. = oil-extended].

On the basis of the data reported in Table 3, it may noted how using the organic compound containing a nitroxide group ([=N—O]) is capable of improving the stability of the living end group so making it possible to achieve appreciably higher coupling efficiencies.

Example 12 (Comparative)

The polymerisation reactions were carried out in a pair of CSTR type reactors in series, each of which had a volume of 100 liters. The various reactants were introduced by means of pumps controlled by mass flow meters. The mixture of reactants, i.e. cyclohexane (Bitolea), styrene (Versalis SpA), 1,3-butadiene (Versalis SpA), 2-methoxyethyl tetrahydrofuran (THFA-ethyl) (Thomas Swan), and optional "antifouling" agent [1,2-butadiene (Bayer)], was prepared in a stirred reactor under an inert atmosphere to ensure that the composition remained constant throughout the duration of the test. The n-butyllithium (Aldrich), on the other hand, was directly introduced into the first CSTR type reactor of the series. Residence times were managed by controlling input flow rates, while the reaction temperature was determined by controlling the temperature of the solvent/monomer mixture and on the basis of the heat tonality of the reaction.

Polymerisation was performed in accordance with the above-described operating conditions, with residence times of 45 minutes for each CSTR type reactor, with introduction of a cyclohexane/monomer mixture containing 9% by weight of 1,3-butadiene and 3% by weight of styrene, together with 100 ppm di 2-methoxyethyl tetrahydrofuran (THFA-ethyl). The quantity of n-butyllithium introduced was equal to 0.028 grams per 100 grams of monomer mixture. Under these conditions, the input temperature of the first CSTR type reactor was 48° C. and the output temperature was 93° C. Once the polymer solution obtained had been deactivated by addition of ethyl alcohol (Carlo Erba) in an equimolecular quantity with respect to the quantity of n-butyllithium introduced, TDAE ("treated distillate aromatic extract") non-aromatic oil (Repsol) was added using an in-line mixer in a quantity equal to 27.5% by weight with respect to the total weight of the finished copolymer together with a mixture of antioxidants comprising Irganox® 565 (Ciba) and Irgafos® 168 (Ciba) in a quantity such that the content in the finished copolymer was respectively 0.1% by weight and 0.4% by weight, with respect to total weight of the copolymer. The polymer solution obtained at the output from the second reactor was sent for solvent removal by water stripping and subsequent drying by extrusion.

The styrene-butadiene copolymer obtained was subjected to some of the above-mentioned characterisations: the results obtained are reported in Table 4, which also shows the residence times (r.t.) in the two CSTR type reactors.

Example 13 (Comparative)

Polymerisation was performed in accordance with the process conditions described in Example 12 but increasing the residence times in the two CSTR type reactors to 60 minutes for each reactor, in order to reduce the quantity of free monomers present at the end of the polymerisation train.

In this connection, a cyclohexane/monomer mixture containing 9% by weight of 1,3-butadiene and 3% by weight of styrene was introduced, together with 100 ppm of 2-methoxyethyl tetrahydrofuran (THFA-ethyl). The quantity of n-butyllithium introduced was equal to 0.028 grams per 100 grams of monomer mixture. Under these conditions, the input temperature of the first CSTR type reactor was 45° C. and the output temperature was 94° C. Once the polymer solution obtained had been deactivated by addition of ethyl alcohol (Carlo Erba) in an equimolecular quantity with respect to the quantity of n-butyllithium introduced, TDAE ("treated distillate aromatic extract") non-aromatic oil (Repsol) was added using an in-line mixer in a quantity equal to 27.5% by weight with respect to the total weight of the finished copolymer together with a mixture of antioxidants comprising Irganox® 565 (Ciba) and Irgafos® 168 (Ciba) in a quantity such that the content in the finished copolymer was respectively 0.1% by weight and 0.4% by weight, with respect to total weight of the copolymer. The polymer solution obtained at the output from the second reactor was sent for solvent removal by water stripping and subsequent drying by extrusion.

The styrene-butadiene copolymer obtained was subjected to some of the above-mentioned characterisations: the results obtained are reported in Table 4, which also shows the residence times (r.t.) in the two CSTR type reactors.

Example 14 (Invention)

Polymerisation was performed in accordance with the process conditions described in Example 12 but increasing the residence times in the two CSTR type reactors to 60 minutes for each reactor, in order to reduce the quantity of free monomers present at the end of the polymerisation train.

In this connection, a cyclohexane/monomer mixture containing 9% by weight of 1,3-butadiene and 3% by weight of styrene was introduced, together with 100 ppm of 2-methoxyethyl tetrahydrofuran (THFA-ethyl) (Thomas Swan). A homogeneous mixture of n-butyllithium and 2,2,6,6-tetramethyl-1-piperidinyloxy (TEMPO) (Aldrich) was prepared using an in-line mixer into which the 2,2,6,6-tetramethyl-1-piperidinyloxy (TEMPO) and n-butyllithium flow continuously: the conditions are adjusted to ensure a contact time between the two compounds of at least 5 minutes. The quantity of n-butyllithium which was introduced was equal to 0.112 grams per 100 grams of monomer mixture and the quantity of 2,2,6,6-tetramethyl-1-piperidinyloxy (TEMPO) was equal to 0.82 grams per 100 grams of monomer mixture, to obtain a molar ratio between the 2,2,6,6-tetramethyl-1-piperidinyloxy (TEMPO) and the active n-butyllithium equal to 3:1. Under these conditions, the input temperature of the first CSTR type reactor was 47° C. and the output temperature was 91° C. Once the polymer solution obtained had been deactivated by addition of ethyl alcohol (Carlo Erba) in an equimolecular quantity with respect to the quantity of n-butyllithium introduced, TDAE ("treated distillate aromatic extract") non-aromatic oil (Repsol) was added using an in-line mixer in a quantity equal to 27.5% by weight with respect to the total weight of the finished copolymer together with a mixture of antioxidants comprising Irganox® 565 (Ciba) and Irgafos® 168 (Ciba) in a quantity such that the content in the finished copolymer was respectively 0.1% by weight and 0.4% by weight, with respect to total weight of the copolymer. The polymer solution obtained at the output from the second reactor was sent for solvent removal by water stripping and subsequent drying by extrusion.

The styrene-butadiene copolymer obtained was subjected to some of the above-mentioned characterisations: the results obtained are reported in Table 4, which also shows the residence times (r.t.) in the two CSTR type reactors.

TABLE 4

| Example | r.t. [min] | R | Sty [%] | 1,2-Vinyl [%] | $M_n$ [dalton] | $M_w$ [dalton] | D | α | [BDE] [ppm] | [Sty] [ppm] |
|---|---|---|---|---|---|---|---|---|---|---|
| 12 (comparative) | 45 | 0 | 26.1 | 25.1 | 234,000 | 625,000 | 2.67 | 0.54 | 73 | 225 |
| 13 (comparative) | 60 | 0 | 25.7 | 24.4 | 227,000 | 629,000 | 2.77 | 0.53 | 120 | 365 |
| 14 (invention) | 60 | 3 | 25.8 | 22.9 | 248,000 | 551,000 | 2.22 | 0.58 | 20 | 58 |

r.t.: residence time in each reactor;
R: molar ratio between the organic compound containing the nitroxide group (=N—O) and the active n-butyllithium in the polymerisation;
[Sty]: content of unreacted styrene at the output from the second reactor;
1,2-vinyl: 1,2-vinyl unit content in the copolymer;
$M_n$: number-average molecular weight of the copolymer;
$M_w$: weight-average molecular weight of the copolymer;
D: polydispersity index $M_w/M_n$;
α: alpha MALLS index;
[BDE]: content of unreacted butadiene content at the output from the second reactor.

On the basis of the data reported in Table 4, it may be noted how in Examples 12 and 13 the value of the α MALLS index and the variation in the radius of gyration (not reported in Table 4) with respect to the molecular masses indicate that branching is concentrated in the high molecular weight ($M_w$) fractions, whereas in the case of Example 14 the value of the α MALLS index and the variation in the radius of gyration (not reported in Table 4) with respect to the molecular masses do not reveal the presence of any significant branching. The result is confirmed by the corresponding values of the polydispersity index $M_w/M_n$. With regard to the content of free monomers measured at the output from the second reactor, it may be noted how, in the absence of the organic compound containing a nitroxide group (=N—O), the increase in residence times for each individual reactor from 45 minutes to 60 minutes is ineffective in reducing the content of free monomers at the output from a series of CSTR type reactors. Example 14 does, in contrast, show that the greater stability of the living carbanionic end groups due to the presence of the organic compound containing a nitroxide group (=N—O), makes the increase in mean residence times effective in terms of reducing the content of unreacted monomers.

Example 15 (Comparative)

Polymerisation was performed in accordance with the process conditions described in Example 12, with the difference that the second CSTR type reactor had a volume of 50 liters. The average residence time in the first reactor was 60 minutes and that in the second reactor was 30 minutes, the concentration of 1,3-butadiene in n-hexane was 20% by weight with respect to the total weight of the solution and the temperature 135° C. The quantity of n-butyllithium introduced was equal to 0.035 g per 100 g of 1,3-butadiene. 0.015 grams of "antifouling agent" (1,2-butadiene—Bayer) per 100 g of 1,3-butadiene were also added. Under these conditions, conversion is virtually complete in the first CSTR type reactor and the polymer undergoes significant formation of long chain branching (LCB) by a thermal pathway. Once the polymer solution obtained had been deactivated by addition of ethyl alcohol (Carlo Erba) in an equimolecular quantity with respect to the quantity of n-butyllithium introduced, a mixture of antioxidants comprising Irganox® 565 (Ciba) and Irgafos® 168 (Ciba) was added using an in-line mixer in a quantity such that the content in the finished copolymer was respectively 0.1% by weight and 0.4% by weight, with respect to the total weight of the copolymer. The polymer solution obtained at the output from the second reactor was sent for solvent removal by water stripping and subsequent drying by extrusion.

The polybutadiene obtained was subjected to some of the above-mentioned characterisations: Table 5 reported the obtained results.

Example 16 (Invention)

Polymerisation was performed in accordance with the process conditions described in Example 12, with the difference that the second CSTR type reactor had a volume of 50 liters. The average residence time in the first reactor was 60 minutes and that in the second reactor was 30 minutes, the concentration of 1,3-butadiene in n-hexane was 20% by weight with respect to the total weight of the solution and the temperature 135° C. 0.015 grams of "antifouling agent" (1,2-butadiene—Bayer) per 100 g of 1,3-butadiene were also added. A homogeneous mixture of n-butyllithium and 2,2,6,6-tetramethyl-1-piperidinyloxy (TEMPO) (Aldrich) was prepared using an in-line mixer into which the 2,2,6,6-tetramethyl-1-piperidinyloxy (TEMPO) and n-butyllithium flow continuously: the conditions are adjusted to ensure a contact time between the two compounds of at least 5 minutes. The quantity of n-butyllithium which was introduced was equal to 0.105 grams per 100 grams of monomer mixture and the quantity of 2,2,6,6-tetramethyl-1-piperidinyloxy (TEMPO) was equal to 0.513 grams per 100 grams of monomer mixture, to obtain a molar ratio between the 2,2,6,6-tetramethyl-1-piperidinyloxy (TEMPO) and the active n-butyllithium equal to 2:1. Under these conditions, conversion is virtually complete in the first CSTR type reactor. Once the polymer solution obtained had been deactivated by addition of ethyl alcohol (Carlo Erba) in an equimolecular quantity with respect to the quantity of n-butyllithium introduced, a mixture of antioxidants comprising Irganox® 565 (Ciba) and Irgafos® 168 (Ciba) was added using an in-line mixer in a quantity such that the content in the finished copolymer was respectively 0.1% by weight and 0.4% by weight, with respect to the total weight of the copolymer. The polymer solution obtained at the output from the second reactor was sent for solvent removal by water stripping and subsequent drying by extrusion.

The polybutadiene obtained was subjected to the above-described characterisations: Table 5 reported the obtained results.

TABLE 5

| Example | R | $M_n$ [dalton] | $M_w$ [dalton] | D | α |
|---|---|---|---|---|---|
| 15 (comparative) | 0 | 181,000 | 567,000 | 3.13 | 0.47 |
| 16 (invention) | 2 | 189,000 | 425,000 | 2.25 | 0.55 |

R: molar ratio between the organic compound containing the nitroxide group (=N—O) and the active n-butyllithium in the polymerisation;
$M_n$: number-average molecular weight of the polymer;
$M_w$: weight-average molecular weight of the polymer;
D: polydispersity index $M_w/M_n$;
α: alpha MALLS index.

On the basis of the data reported in Table 5, it may be noted how the value of the α MALLS index of Example 15 indicates that branching is concentrated in the high molecular weight ($M_w$) fractions, while in the case of Example 16 the value of the α MALLS index does not reveal the presence of any significant branching. The result is confirmed by the corresponding values of the polydispersity index (D).

The invention claimed is:

1. A process for the preparation of a diene polymer or a random vinyl arene-diene copolymer comprising:

forming a mixture including: at least one conjugated diene monomer, optionally at least one vinyl arene monomer, at least one hydrocarbon solvent, at least one lithium-based initiator and at least one organic compound containing at least one nitroxide group having general formula (I) or (II):

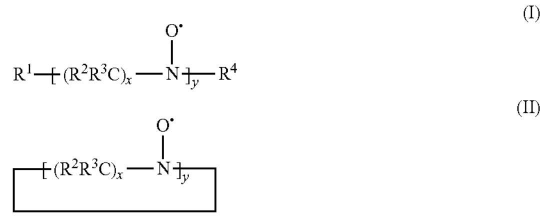

wherein:

$R^1$, $R^2$, $R^3$ and $R^4$, mutually identical or different, represent a hydrogen atom;

or are selected from $C_1$-$C_{20}$, linear or branched alkyl groups optionally containing heteroatoms, optionally substituted cycloalkyl groups, optionally substituted $C_1$-$C_{20}$, linear or branched alkoxy groups, or optionally substituted aryl groups;

x is an integer ranging from 0 to 7;

y is an integer ranging from 1 to 3;

conducting anionic (co)polymerization in said mixture while said at least one organic compound containing at least one nitroxide group having general formula (I) or (II) is inert, to form a diene polymer or a random vinyl arene-diene copolymer.

2. The process for the preparation of a diene polymer or a random vinyl arene-diene copolymer according to claim 1, wherein said conjugated diene monomer is selected from: 1,3-butadiene, isoprene, 2,3-dimethyl-1,3-butadiene, 1,3-pentadiene (piperylene), 2-methyl-3-ethyl-1,3-butadiene, 1,3-octadiene, or mixtures thereof, optionally in anhydrous form.

3. The process for the preparation of a diene polymer or a random vinyl arene-diene copolymer according to claim 1, wherein said vinyl arene monomer is selected from: styrene, α-methylstyrene, 1-vinylnaphthalene, 2-vinylnaphthalene, or the alkyl derivatives thereof, or mixtures thereof, optionally in anhydrous form.

4. The process for the preparation of a diene polymer or a random vinyl arene-diene copolymer according to claim 1, wherein said anionic (co)polymerisation is carried out in the presence of:

- 40% by weight-100% by weight with respect to the total weight of conjugated diene monomer and optional vinyl arene monomer, of at least one conjugated diene monomer; and
- 0% by weight-60% by weight with respect to the total weight of conjugated diene monomer and optional vinyl arene monomer, of at least one vinyl arene monomer;

wherein said at least one organic compound containing at least one nitroxide group having general formula (I) or (II) is added prior to or concurrently with said at least one lithium-based initiator in forming said mixture.

5. The process for the preparation of a diene polymer or a random vinyl arene-diene copolymer according to claim 1, wherein said hydrocarbon solvent is selected from propane, n-butane, iso-butane, n-pentane, iso-pentane, n-hexane, n-heptane, n-octane, cyclohexane, cyclopentane, propene, 1-butene, iso-butene, trans-2-butene, cis-2-butene, 1-pentene, 2-pentene, 1-hexene, 2-hexene, benzene, toluene, xylene, ethylbenzene, or mixtures thereof, optionally in anhydrous form.

6. The process for the preparation of a diene polymer or a random vinyl arene-diene copolymer according to claim 1, wherein said lithium-based initiator is selected from compounds having general formula (III):

$$R_5(Li)_n \qquad \text{(III)}$$

wherein $R_5$ represents a $C_1$-$C_{20}$ linear or branched alkyl group, a $C_3$-$C_{30}$ cycloalkyl group, a $C_6$-$C_{30}$ aryl group, or mixtures thereof; and n is an integer ranging from 1 to 4.

7. The process for the preparation of a diene polymer or a random vinyl arene-diene copolymer according to claim 1, wherein said anionic (co)polymerisation is carried out in the presence of at least one polar modifier selected from: non-cyclic ethers; tertiary amines; cyclic ethers; chelating ethers; chelating amines; or mixtures thereof.

8. The process for the preparation of a diene polymer or a random vinyl arene-diene copolymer according to claim 1, wherein said organic compound containing at least one nitroxide group having general formula (I) or (II) is selected from: 2,2,6,6-tetramethyl-1-piperidinyloxy (TEMPO) or derivatives thereof or mixtures thereof; diphenylnitroxide or derivatives thereof, or mixtures thereof; 1,1,3,3-tetraethylisoindolin-2-yl-oxyl (TEDIO); 1,1,3,3-tetramethylisoindolin-2-yl-oxyl (TMEDIO); or mixtures thereof.

9. The process for the preparation of a diene polymer or a random vinyl arene-diene copolymer according to claim 1, wherein said organic compound containing at least one nitroxide group having general formula (I) or (II), and said lithium-based initiator are used in a molar ratio ranging from 0.1 to 20.

10. The process for the preparation of a diene polymer or a random vinyl arene-diene copolymer according to claim 1, wherein said anionic (co)polymerisation is carried out at a temperature ranging from 0° C. to 150° C.

11. The process for the preparation of a diene polymer or a random vinyl arene-diene copolymer according to claim 1, wherein said anionic (co)polymerisation is carried out for a time ranging from 5 minutes to 10 hours.

12. The process for the preparation of a diene polymer or a random vinyl arene-diene copolymer according to claim 1, wherein the resultant diene polymer or random vinyl arene-diene copolymer has a polydispersity index $M_w/M_n$ ranging from 1 to 2.5.

13. The process for the preparation of a diene polymer or a random vinyl arene-diene copolymer according to claim 6 wherein said lithium based initiator is selected from: n-butyllithium, sec-butyllithium, t-butyllithium, n-propyllithium, iso-butyllithium, amyllithium, or mixtures thereof.

14. The process for the preparation of a diene polymer or a random vinyl arene-diene copolymer according to claim 7 wherein said anionic (co)polymerisation is carried out in the presence of at least one polar modifier selected from: ethyl ether; tributylamine; tetrahydrofuran (THF); ethylene glycol dimethyl ether (dimethyl glycol), dioxane, 2-methoxyethyl tetrahydrofuran (THFA-ethyl), 2-methoxyethyl tetrahydropyran, or mixtures thereof; N,N,N',N'-tetramethylethylenediamine (TMEDA); or mixtures thereof.

15. The process for the preparation of a diene polymer or a random vinyl arene-diene copolymer according to claim 9, wherein said organic compound containing at least one nitroxide group having general formula (I) or (II), and said lithium-based initiator are used in a molar ratio ranging from 0.5 to 3.

16. The process for the preparation of a diene polymer or a random vinyl arene-diene copolymer according to claim 12, wherein the resultant diene polymer or random vinyl arene-diene copolymer has a polydispersity index $M_w/M_n$ ranging from 1.1 to 2.3.

17. The process for the preparation of a diene polymer or a random vinyl arene-diene copolymer according to claim 1, wherein:

- $R^1$, $R^2$, $R^3$ and $R^4$, mutually identical or different, represent a hydrogen atom;
- or are selected from $C_1$-$C_8$, linear or branched alkyl groups optionally containing heteroatoms selected from oxygen, nitrogen or sulfur, optionally substituted cycloalkyl groups, optionally substituted $C_1$-$C_8$, linear or branched alkoxy groups, or optionally substituted aryl groups;
- x is an integer ranging from 4 to 5;
- y is an integer ranging from 1 to 2.

18. The process for the preparation of a diene polymer or a random vinyl arene-diene copolymer according to claim 17, wherein said conjugated diene monomer is selected from: 1,3-butadiene, isoprene, 2,3-dimethyl-1,3-butadiene, 1,3-pentadiene (piperylene), 2-methyl-3-ethyl-1,3-butadiene, 1,3-octadiene, or mixtures thereof, optionally in anhydrous form.

19. The process for the preparation of a diene polymer or a random vinyl arene-diene copolymer according to claim 18, wherein said vinyl arene monomer is selected from: styrene, α-methylstyrene, 1-vinylnaphthalene, 2-vinylnaphthalene, or the alkyl derivatives thereof, or mixtures thereof, optionally in anhydrous form.

* * * * *